July 8, 1969   NORMAN N. LI   3,454,489
DESALINATION PROCESS
Filed May 23, 1966
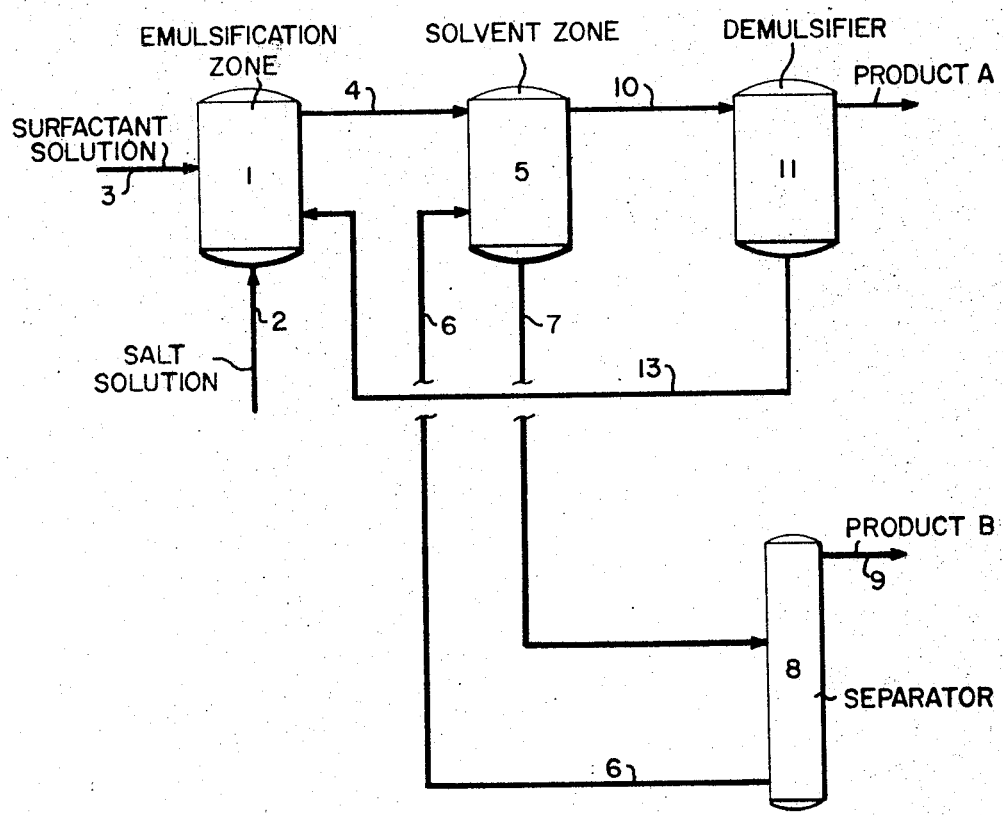
Norman N. Li   Inventor
By Michael Lerner
Patent Attorney 3,454,489
DESALINATION PROCESS
Norman N. Li, Somerset, N.J., assignor to Esso Research
and Engineering Company, a corporation of Delaware
Filed May 23, 1966, Ser. No. 552,198
Int. Cl. B01d 11/04
U.S. Cl. 210—22                              4 Claims

ABSTRACT OF THE DISCLOSURE

A process of desalinating water by forming an emulsion comprising drops of salt water coated with surfactant membranes, and washing the emulsion to recover permeated product water from the surface of the drops.

---

This invention pertains to a process for separating liquids from solution. More particularly, this invention pertains to a method for separating salt or liquid from admixture with liquid. In its more particular form this invention pertains to the separation of salt from liquid solutions particularly saline solutions; saline solutions include bracklish waters, sea water, and, in general, salt solutions of any kind in which it is desired to separate salt from water. The separation of salt from liquid or liquid from liquid is achieved by selective permeation through an oil-soluble liquid, surfactant membrane.

The problem of separating salt from liquid in which it is dissolved has been present for many years. Recently, this problem has become increasingly important because of a rapidly diminishing water supply. Thus, one ramification of the problem of separating salt from liquid, the separation of salt from sea water, has become perhaps the most important problem under surveillance in the world today.

Other problems associated with the separation of salt from liquid includes corrosion and large heat consumption.

A great variety of different methods have been utilized in an attempt to effectively separate salt from sea water. Perhaps the greatest effort in this area has been devoted to the growing of crystals within the solution and then the subsequent separation of ice crystals from the salt remaining in solution. Unfortunately, the crystallization techniques utilized have met with limited success. This is due mainly to the fact that most techniques involve a sudden chilling of the solution. The sudden chilling, sometimes referred to as shock chilling, results in the formation of crystals with an extremely wide particle size distribution. Many of the crystals are extremely small in size and almost impossible to filter on an effective large-scale basis.

Additionally, the presence of the small crystals tend to blind any filters that are in use. Alternatively, it has been attempted to evaporate the liquid away from the salt and trap the liquid vapors for eventual recovery as a salt-free liquid. This technique looks somewhat promising, but it does involve enormous expense. It will probably necessitate an effective atomic power system and the expense involved is, at present, prohibitive. Since the problems associated with the presence of salt in liquid are acute, a more immediate solution is needed.

According to this invention, the problems encountered in previous attempts to separate salt from solutions have now been solved. It has unexpectedly been discovered that the separation of salt from solutions, particularly salt from sea water, with the resulting recovery of a substantially salt-free fresh water can be accomplished by means of selective permeation of one component of a salt-liquid mixture through a liquid surfactant membrane. Preferably, the surfactant-coated droplets of the mixture to be separated are emulsified in order to enhance the separation. The individual droplets of the mixture may first be emulsified and then coated, or the coated droplets may be emulsified; the latter technique is more desirable. However, either may be utilized.

In copending applicaiton Ser. No. 537,580, now U.S. Patent No. 3,389,078, the problems of the prior art membranes were basically solved. In this application it was discovered that the separation of materials, especially water and water-soluble solids and liquids which may be quite similar in their physical and/or chemical properties can be achieved by selective permeation through liquid membranes formed by oil solutions of surfactant molecules. Surfactants are surface active agents having hydrophobic and hydrophilic ends. Although the use of liquid surfactant membranes represents a significant improvement over the prior art, this process was still faced with problems. The previous use of liquid surfactant membranes resulted in some drop break up in the solvent phase. This could be avoided by increasing the membrane thickness, but this in turn would cut down on mass transfer. An improvement on the process was made in Ser. No. 533,933, now U.S. Patent No. 3,410,794, wherein an emulsion comprising droplets of a hydrocarbon mixture surrounded by a surfactant membrane is formed. The formation of an emulsion of the surfactant coated droplets of the mixture to be separated cuts down on the drop break up since the size of the droplets in the mixture to be separated is reduced. Reduction of drop size leads directly to a decrease of surface force responsible for membrane rupture. This results in an increase in drop stability.

In addition, the rate of mass transfer is increased by utilizing a pressure gradient. Emulsion droplets which range in size from $1 \times 10^{-7}$ cm. to $1 \times 10^{-2}$ cm. possess high internal pressure as a result of large curvature effect. It can be shown that the difference between the internal and external pressures is equal to twice the ratio of surface tension to drop radius. Therefore, in the presence of surface forces, a decrease in drop size results directly in an increase of the internal and external pressure difference. (Ref. Surface Chemistry by L. I. Osipow, p. 11, Reinhold Publishing Corporation, New York (1962)).

Finally, the total large surface presented by these small droplets results in extremely efficient mass transfer. Reducing the drop radius by half doubles the total surface area. In fact, the permeation rate of the more permeable component of a given mixture increases about 20 to 50 times over the use of liquid surfactant membranes without the use of emulsion.

The general advantages to be gained by the use of liquid membrane films over the solid polymeric films used in the past are numerous. Film life is extremely critical in selecting polymeric membranes whereas the problem does not exist in liquid membranes. Unlike its solid state counterpart, the liquid membrane is homogenous in composition and is free of pinholes as a result of surface tension effect. Additionally, the solid membrane requires mechanical support; a liquid surfactant memberane would not need a support.

The thinnest solid polymeric membrane which may be reasonably utilized is about $10^{-4}$ inches thick. Whereas for a liquid membrane, which can be a single molecular layer, the thickness may be in the order of $10^{-7}$ inches. Since permeation rate is inversely proportional to the film thickness, the use of a thinner membrane results in a far higher permeation rate.

Mass transfer rate per volume of equipment are also considerably higher because droplets have more interfacial area. The key to a successful permeation operation is the rate at which the liquid diffuses through the memrane utilized. If the rate is low, the process becomes too time-consuming and is, therefore, ineffective. The instant process, which combines the numerous advantages outlined above associated with the use of liquid surfactant membranes, with the additional advantages of the emulsifying of the surfactant coated droplets of the mixture to be separated, results in an extremely efficient separation process.

In more detail, the process of the instant invention concerns the discovery that one may separate water-soluble liquids or salts from solution by means of a selective permeation through liquid membranes which are formed by oil-soluble surfactant molecules. As indicated above, this separation may be enhanced by emulsifying the droplets of the mixture before or after they are coated with the liquid surfactant membrane. The emulsified droplets have a diameter of $10^{-7}$ cm. to $10^{-2}$ cm., preferably $10^{-6}$ cm. to $10^{-4}$ cm. The emulsification of the droplets may take place in any well-known manner such as high speed mechanical stirring.

The individual droplets are coated with a liquid surfactant membrane which allows either the salt or the liquid phase to permeate more rapidly. In some instances the salt will permeate at a greater rate than the liquid. This is most commonly found when using a strongly polar surfactant. Examples of this are given further on in this specification.

In other instances, the liquid, which may be water, will permeate more rapidly than the salt. The rapid permeation of the liquid is encouraged by the compatibility of the membrane with water. As an example, the surfactant used to make such liquid membranes can be Span, which is fatty acid esters of anhydro sorbitols condensed with ethylene oxide.

The emulsified droplets of solution, which are surfactant-coated, are then washed with a solvent phase. The more permeable member or members of the solution will pass at a more rapid rate through the surfactant membrane. It is preferred to have the more permeable member of the mixture, whether salt or liquid, pass into the solvent phase which continually washes the more permeable member away from the surfactant-coated mixture. The more permeable member of the mixture, along with a relatively smaller amount of the less permeable member, is then separated from the solvent by conventional means, such as distillation. The less permeable member or members of the solution, along with a lesser amount of the more permeable member of the solution, are passed while still coated with the surfactant membrane to a demulsification zone, which may be an electrostatic coalescer. At this point the emulsion is broken and the less permeable compound, along with a small amount of the more permeable compound, is then separated from the oil surfactant solution. Generally, two separate layers are formed after the demulsification which are the less permeable compound layer and the oil solution of surfactants. The former is taken out as product and the latter is sent to the emulsifier to be re-used.

It is within the scope of this invention to treat further the more permeable and less permeable members of the mixture in order to obtain a more complete separation. Thus, several different separation zones may be used in series in order to make the separation as distinct as desired. In the case of desalinating water, using a series of 6 to 10 separation zones, a separation which produces fresh water at a purity of 98.5 to 99.0 may be obtained.

Any of the various oil-soluble surfactants may be utilized. However, if one is desirous of having the salt permeate more readily than the liquid, it is preferred to use the surfactants with strong polarity. If it is more desirous to have the liquid pass through at a faster rate and the salt remain concentrated within the surfactant membrane, one would utilize the surfactants with weak polarity and with high structural compatibility with the liquid permeate.

A wide variety of different surfactant groups may be utilized for the process of the instant invention. The various surfactant groups include long-chain polar surfactants, fluorocarbon surfactants, silicones and miscellaneous surfactants such as polymeric surfactants. All may be utilized in the process of the instant invention. Although for a given separation, one group may achieve greatly enhanced separation. The preferred grouping of surfactant to be utilized in the instant invention are the surfactants with strong polar groups, since high polarity of the surfactants aids in attracting permeates and therefore increasing transfer rate. Typical polar groups are —COOH, —OH, —NH$_2$, —CONH$_2$, —SH, —SO$_3$H, and salts of long-chain carboxylic acids and sulfonates. The long-chain polar surfactants include a wide range of compounds such as ethylene glycol polyethers, polyethyleneoxy ethanol, phosphate radical on polyethyleneoxy molecule. The latter is a weakly anionic surfactant.

Short-chain fluorocarbons with polar groups are frequently sufficiently soluble in hydrocarbon oils to function as surfactants. Long-chain fluorocarbons attached to a hydrocarbon chain of sufficient length are soluble in hydrocarbon oils.

Silicone oils differ broadly in their chemical structure and surface-active properties. Those of sufficiently small molecular weight to be soluble in the hydrocarbon solvent and containing only CH$_3$ groups attached to silicon in the (Si—O)$_n$ skeleton can be expected to be surface-active.

The final overall grouping can best be called miscellaneous and includes a broad category of macromolecules and polymers such as fatty alcohols.

Since the number of surfactants is extremely large, it is not intended to burden this application with numerous examples. The following publications are herein incorporated by reference. Surface Chemistry by Lloyd I. Osipow, Reinhold Publishing Company, New York (1962) chapter 8 and Surface Activity, Moilliet et al., Van Nostrand Company, Inc. (1961) Part III.

Typical surfactants that may be utilized with this invention include Igepal. This is a nonionic surfactant, nonylphenoxypolyethyleneoxy ethanol. It is a trademark of the General Aniline and Film Corporation and has the configuration RC$_6$H$_4$O(CH$_2$CH$_2$O)$_n$CH$_2$CH$_2$OH where R may be C$_8$H$_{17}$, C$_9$H$_{19}$ or C$_{10}$H$_{21}$ and $n$ varies from 1.5 to 100. Igepals with $n$ values up to 8 are oil-soluble surfactants.

Span, a trademark of the Atlas Chemical Industries, is a series of surface active agents in the group of long-chain polar surfactants. Spans are also known as sorbitan fatty acid esters because they are fatty acid esters of anhydro sorbitols condensed with ethylene oxide.

Cellulose acetate, a member of the group of macromolecules and polymers is one of the cellulose esters of the organic acids. By the action of acetic anhydride on cotton in the presence of a little acid, cellulose acetate can be prepared. It has the formula

and $n$ will vary depending on the conditions utilized.

Surfactant solution along with a suitable solution to be separated, i.e., salt water, is placed into a containing zone. Within this zone, the mixture is emulsified. This may be done in any of several ways such as by high speed stirrers, colloid mills, valve homogenizers, ultrasonic generators, or mixing jets. The mixture can be emulsified prior to the addition of the surfactant but it is preferred to add the surfactant and then emulsify the mixture. The preferred method of obtaining an emulsion is mixing the surfactant solution and the salt water for about 1 to 5 minutes at speeds of 300 r.p.m. or higher. The surfactant coats the droplets of the salt water within the emulsion. These droplets are about 1 x 10$^{-7}$ to 1 x 10$^{-2}$ cm. in diameter. The emulsion is next passed into a permeation zone. Within the zone the surfactant coated droplets are gently washed with solvent. The more permeable member or members of the solution pass out into the solvent phase. The solvent phase which is rich in the more permeable member of the mixture is then passed out of the permeation zone. The solvent phase is selected so that all members of the solution are miscible to some degree with this phase. The miscibility is preferred to be substantially similar for all the components of the mixture since in this manner the separation is dependent on permeability through the surfactant membrane rather than a solvent extraction process. The solvent phase itself is preferably aqueous in nature. Among the more effective solvents that may be utilized for washing the emulsion and separating the more permeable member of the aqueous solution or mixture are water, alcohols and glycols.

As another alternative, multi-stages may be used to achieve additional enrichment in the nonpermeating compound or compounds. It would be apparent that by using several stages of permeation a very fine separation could be made of almost any solution no matter how close the relative rates of permeation are of the components of the mixture. Thus, after an initial separation the more permeable member or members of the solution are separated from the solvent phase and may be recycled back to the original emulsion zone to be once again contacted with liquid surfactant and a new emulsion formed. In the same manner after the emulsion has been broken the solution rich in less permeable compound or compounds may be recycled back to the emulsion zone and treated again. This may continue as frequently as desired in order to produce substantially pure compounds.

An extremely wide range of salt-containing liquids may be effectively separated by the instant invention. This would include water containing sodium ion as well as other metal ions. Therefore, this instant invention can effect desalination of seawater as well as extraction of ore or minerals from their aqueous solutions. Also, any liquid miscible with water, such as alcohol in water, ketone in water, and acid, such as acetic acid, in water may be separated by this instant invention. This instant invention is also an effective way to separate azeotropic mixtures such as methyl ethyl ketone and water.

The following theory is offered for the operation of the instant invention; there is no intent to be bound by any particular mechanism. The process of permeation of fluids through a liquid membrane may be composed of three independent steps. Initially, a solution of the permeating molecules may be formed on the inside face of the liquid membranes. Next, the molecules diffuse through the membrane. Finally, the molecules must be desorbed from the outside face of the membrane. Thus, among the factors which will effect the diffusion through a liquid membrane are the membrane permeate compatibility, activity gradient and membrane hole size.

A wide range of temperatures may be utilized in the process of the instant invention. Temperatures used in the separation process itself are not critical. There would, however, be a lower and an upper limit which would be satisfactory for separation with a liquid phase surfactant membrane. The lowest temperature should be higher than the freezing temperature of the surfactant solution. It will also have to be higher than the freezing temperature of the surfactant or of the aqueous mixture so that mass transfer will be facilitated.

In the event that nonionic surfactants are utilized, the highest temperature should be lower than the precipitation temperature of the surfactant. If an ionic surfactant is to be used, the highest temperature is restricted by the boiling point of the surfactant solution. Of course, the temperature will have to be lower than the boiling point of the aqueous feed or the solvent. Thus, the temperature is to be regulated by the boiling point of the lowest boiling element in the separation. It would be preferred to use room temperature since there is no additional expense in obtaining this level.

Pressure is also not critical and the most desirable pressure would be ambient, i.e., one atmosphere. Sufficient pressure will be needed to maintain all the elements of the separation, i.e., surfactant, solvent and acqueous mixtures, in liquid phase.

The amount of surfactant to be added to the mixture which is to be separated may also vary within wide ranges. $10^{-4}$ to $10^{-1}$ moles of surfactant may be added per liter of oil, preferably $10^{-2}$ to $10^{-1}$ moles of surfactant per liter of oil. It should be emphasized that liquid membranes are utilized for the separation of liquid phase mixtures. The solvent phase must be miscible with the mixture to be separated. This process may also be utilized to separate mixtures of gases.

The solvents which may be utilized to wash the more permeable component away from the surfactant membrane are also quite varied in scope. Any liquid which is miscible with the aqueous feed can be used. This includes water, brackish water, ethylene glycol and its water-soluble derivatives such as diethylene glycol monobutyl ether, alcohols such as isopropyl alcohol, ketones such as acetone and water-soluble acids and bases.

The selection of the solvent depends not only on its compatibility with the permeates but also on the process economics.

The attached figure represents a schematic view of the separation scheme of the instant invention.

Turning to the figure, a mixture which may be any salt solution, but in this instance is salt water containing about 4% by weight of salt is introduced into emulsification zone 1, through line 2. A surfactant, which in this case would be Span 80, is introduced into the emulsification zone 1 through line 3. About $1 \times 10^{-3}$ to $1 \times 10^{-2}$ moles of surfactant were added to the zone per mole of mixture to be separated. Within zone 1 an emulsion is formed by mixing the surfactant and salt solution together at high speeds, speeds of 300 r.p.m. may be utilized. The surfactant coats the individual mixture droplets with a liquid coating. The liquid-coated droplets have a maximum diameter roughly of 0.01 cm. and are passed through line 4 to solvent zone 5. Within this zone the mixture is gently washed with solvent. Solvent is passed into the solvent zone 5 through line 6. The washing of emulsion with solvent is accomplished by mixing the emulsion with solvent at low speed; speeds of 10 to 100 r.p.m. may be utilized. In this particular instance, the solvent is water and methyl ethyl ketone mixture. The washing period takes from 10 to 15 minutes and is conducted at a temperature of 70° to 80° F. ambient pressure. Solvent, along with the more permeable component, which in this case is water, passes out from the solvent zone 5 through line 7 into separator zone 8, where the solvent is separated from the more permeable component. The solvent is separated within separator 8 which in this case is a fractionator. The solvent is then recycled, if desired, back through line 6 into solvent zone 5. Product is removed through line 9; in this case the product is water. There will, of course, be a minor amount of less permeable component present, but this may be substantially removed by recycling.

An emulsion of surfactant and less permeable compound, with a minor amount of permeable compound still included, is removed through line 10 of zone 5, passed into demulsification zone 11. The demulsification zone may contain an electrostatic precipitator, but any of the well-known methods for breaking an emulsion may be utilized. Once the emulsion is broken, the oil solution of surfactant and the less permeable compound may be readily separated. In this case the less permeable compound is sodium chloride. The sodium chloride is removed through line 12 and the aqueous solution of surfactant is recycled through line 13 back to emulsification zone 1. The aqueous mixture is fed into emulsification zone 1 at a rate of 100 to 1000 cc. per minute. Permeation rates, using the process of the instant invention, will vary between 10 and 1000 gallons per hour per thousand square feet of membrane surface.

If cellulose acetate surfactant membranes are utilized, the salt will more readily permeate through than the liquid.

When utilizing the following surfactants, the liquid will permeate more rapidly than the salt: fatty acid esters of anhydro sorbitols (Spans), polyphenoxy polyethyleneoxy ethanol (Igepals) and polyoxyethylated fatty acid.

Example 1

In this example, a process sequence similar to that in the figure was utilized. A solution comprising salt water, which contained about 4.0% salt, was introduced into emulsification zone 1 through line 2. A surfactant which was a fatty acid ester of anhydro sorbitols introduced into zone 1 through line 3. About 190 grams of salt water was used and about 230 grams of surfactant solution was added through line 3. The surfactant solution and saline mixture were emulsified by means of stirring. The saline solution was placed in the emulsifier first, and then stirred at a speed of 300 r.p.m. The aqueous solution of surfactant was then introduced gradually into the emulsifier. As a result, droplets of 0.01 cm. and smaller diameter were formed, which were coated with surfactant. Temperature for the mixing operation was 80° F. and pressure was 1 atmosphere. After the emulsion was formed, the emulsified mixture was passed through line 4 into solvent zone 5. Here the mixture was gently washed with a solvent which was water with 6% ethylene glycol. Washing was done by mixing at a speed of 60 r.p.m. About 400 cc. of solvent was needed to wash the emulsion. The solvent was passed over the mixture for a period of about 10 to 15 minutes. The compound which permeated more readily, which in this instance was water, together with about 2.2 wt. percent of salt, was passed out of solvent zone 5, along with the solvent, through line 7, passed into separator 8, which was a fractionator. Here the solvent was separated and recycled through line 6. Product was obtained through line 9, which was water. The emulsion was removed from solvent zone 5 through line 10. The emulsion was rich in the less readily permeating compound, which was NaCl. It was then passed into electrostatic coalescer zone 11, wherein the emulsion was broken. Surfactant was removed through line 13 and recycled back into emulsion zone 1. Product was recovered through line 12; this product comprised water having 5.5 wt. percent of salt.

Example 2

In this example the exact conditions of Example 1 were utilized, except that the surfactant was .1 wt. percent of cellulose acetate in 190 grams of toluene and the solvent was water containing 2% acetone. Product was obtained through line 12, which was water having 2.6 wt. percent of salt. The brackish water obtained from the separator was water having 4.8 wt. percent of salt.

What is claimed is:

1. A process for separating salt and water which comprises passing a salt solution and a surfactant into an emulsification zone, said surfactant being a nonpolar surfactant and having high structural compatibility with water, emulsifying said mixture wherein droplets of said mixture are coated with a liquid surfactant membrane, said membrane being more permeable to water than to salt, washing the emulsion with an aqueous solvent phase whereby a solution rich in salt remains within said membrane, separating the solvent phase from the emulsion, breaking the emulsion of said membrane and said solution rich in salt, and recovering said water from said solvent phase.

2. The process of claim 1 wherein said surfactant is cellulose acetate.

3. The process of claim 1 wherein said water rich mixture is washed from said surfactant coating with an aqueous solvent.

4. A process for separating water from a substance soluble therein which comprises passing an equeous solution of said substance together with an oil and a surfactant into an emulsification zone, emulsifying the mixture of said aqueous solution, oil and surfactant whereby droplets of said aqueous solution are coated with a water immiscible membrane, said membrane being more permeable to either water or the water soluble substance than to the other component of the aqueous solution, washing the emulsion with an aqueous solvent phase whereby an aqueous solution rich in the more permeable component passes through the membrane into said solvent phase and an aqueous solution rich in the less permeable component remains within said membrane, separating the solvent from the emulsion, breaking the emulsion comprising said membrane and said aqueous solution rich in the less permeable component, and recovering a mixture rich in water from said aqueous solvent phase.

References Cited

UNITED STATES PATENTS 2,761,563 9/1956 Waterman et al. ------ 210—21

REUBEN FRIEDMAN, *Primary Examiner.*

FRANK A. SPEAR, Jr., *Assistant Examiner.*

U.S. Cl. X.R.

210—23